United States Patent
Yoshii et al.

(10) Patent No.: US 8,534,239 B2
(45) Date of Patent: Sep. 17, 2013

(54) MULTI-CYLINDER DIESEL ENGINE

(75) Inventors: Osamu Yoshii, Sakai (JP); Akihiko Kai, Sakai (JP); Hiroki Oso, Sakai (JP); Yuuji Takemura, Sakai (JP); Tamotsu Kuno, Sakai (JP); Kentarou Kita, Sakai (JP); Tomoya Hasegawa, Sakai (JP); Wataru Miyauchi, Sakai (JP)

(73) Assignee: Kubota Corporation, Osaka (JP)

( * ) Notice: Subject to any disclaimer, the term of this patent is extended or adjusted under 35 U.S.C. 154(b) by 586 days.

(21) Appl. No.: 12/876,483

(22) Filed: Sep. 7, 2010

(65) Prior Publication Data

US 2011/0061630 A1 Mar. 17, 2011

(30) Foreign Application Priority Data

Sep. 15, 2009 (JP) .................................. 2009-212782

(51) Int. Cl.
*F02M 25/07* (2006.01)
*F02M 35/10* (2006.01)

(52) U.S. Cl.
USPC .................................. 123/41.31; 123/568.12

(58) Field of Classification Search
USPC .......... 123/41.31, 41.48, 41.49, 41.56, 41.57, 123/456, 509, 541, 568.12, 568.17
See application file for complete search history.

(56) References Cited

U.S. PATENT DOCUMENTS

| | | | | |
|---|---|---|---|---|
| 5,992,393 | A * | 11/1999 | Yoshida et al. | 123/509 |
| 6,889,666 | B2 * | 5/2005 | Oono | 123/514 |
| 6,971,363 | B2 * | 12/2005 | Aketa et al. | 123/198 R |
| 7,328,691 | B2 * | 2/2008 | Hataura et al. | 123/568.12 |
| 7,461,635 | B2 | 12/2008 | Maegoya et al. | |
| 7,469,681 | B2 | 12/2008 | Hataura et al. | |
| 2005/0205066 | A1 | 9/2005 | Maegoya et al. | |
| 2007/0068492 | A1 | 3/2007 | Hataura et al. | |
| 2011/0277731 | A1 * | 11/2011 | Kajita | 123/456 |
| 2012/0102932 | A1 * | 5/2012 | Mitsuda | 60/311 |

FOREIGN PATENT DOCUMENTS

| | | |
|---|---|---|
| JP | 2005264846 A | 9/2005 |
| JP | 2007092598 A | 4/2007 |
| JP | 2009133274 A | 6/2009 |

* cited by examiner

*Primary Examiner* — Thomas Moulis

(74) *Attorney, Agent, or Firm* — Panitch Schwarze Belisario & Nadel LLP

(57) ABSTRACT

It is an object of the invention to provide a multi-cylinder diesel engine in which a thermal damage of a common rail, and a rise in fuel temperature can be suppressed.

In order to achieve the object, a multi-cylinder diesel engine in which, while the extension direction of a crank shaft 1 is set to the anteroposterior direction, a common rail 3 which is directed in the anteroposterior direction is placed above an intake manifold 2, and an engine cooling fan 4 is placed in front of the engine is configured so that the width direction of the engine which is perpendicular to the anteroposterior direction is set to the lateral direction, an air intake portion 6 of the intake manifold 2 is placed on the outer lateral side of the both lateral sides of the common rail 3, the outer lateral side being opposite to a head cover 5, and the common rail 3 is placed in a place to which engine cooling air produced by the engine cooling fan 4 is blown.

10 Claims, 12 Drawing Sheets

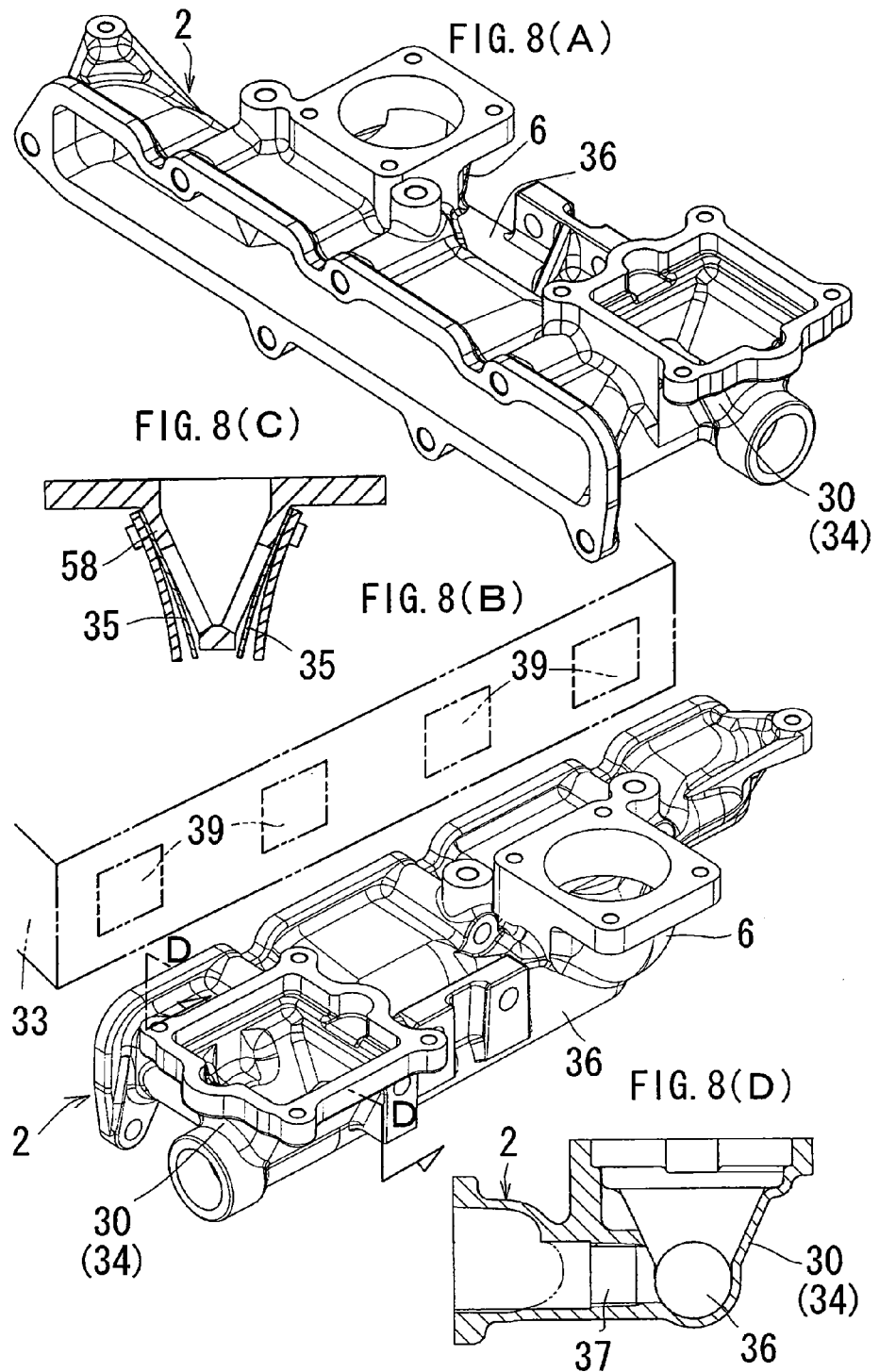

MULTI-CYLINDER DIESEL ENGINE

TECHNICAL FIELD

The present invention relates to a multi-cylinder diesel engine, and more particularly to a multi-cylinder diesel engine in which a thermal damage of a common rail, and a rise in fuel temperature can be suppressed.

BACKGROUND ART

In some multi-cylinder diesel engines, conventionally, a crank shaft extends in the anteroposterior direction, a common rail which is directed in the anteroposterior direction is placed above an intake manifold, and an engine cooling fan is placed in front of the engine (see Patent Literature 1).

An engine of this type has advantages that heat of a cylinder head and a cylinder block is hardly transferred to the common rail, and that the common rail can be air-cooled by engine cooling air produced by the engine cooling fan.

In the prior art, however, an air intake portion of the intake manifold is placed in front of the common rail, and hence there is a problem.

PRIOR ART LITERATURE

Patent Literature

[Patent Literature 1] Japanese Patent Application Laid-Open No. 2009-133274 (see FIGS. 7 and 8)

SUMMARY OF THE INVENTION

Problem to be Solved by the Invention

<Problem> Thermal damage of the common rail, and a rise in fuel temperature easily occur.

Since the air intake of the intake manifold is placed in front of the common rail, the engine cooling air from the engine cooling fan is blocked by the air intake, and fails to be blown to the common rail, with the result that the heat radiation property of the common rail is low, and a thermal damage of the common rail, and a rise in fuel temperature easily occur.

It is an object of the invention to provide a multi-cylinder diesel engine in which a thermal damage of a common rail, and a rise in fuel temperature can be suppressed.

Means for Solving the Problem

The characteristic matter of the invention set forth in Claim 1 is as follows.

As exemplified in FIGS. 1 to 3 or FIGS. 9 to 11, in a multi-cylinder diesel engine, while an extension direction of a crank shaft (1) is set to an anteroposterior direction, a common rail (3) which is directed in the anteroposterior direction is placed above an intake manifold (2), and an engine cooling fan (4) is placed in front of the engine, a width direction of the engine which is perpendicular to the anteroposterior direction is set to a lateral direction, an air intake portion (6) of the intake manifold (2) is placed on an outer lateral side of both lateral sides of the common rail (3), the outer lateral side being opposite to a head cover (5), and the common rail (3) is placed in a place to which engine cooling air produced by the engine cooling fan (4) is blown.

Effects of the Invention (Invention Set Forth in Claim 1)

The invention set forth in Claim 1 achieves the following effects.

<Effect> A thermal damage of the common rail, and a rise in fuel temperature can be suppressed.

As exemplified in FIGS. 1 to 3 or FIGS. 9 to 11, the air intake portion (6) of the intake manifold (2) is placed on the outer lateral side which is opposite to the head cover (5), and the common rail (3) is placed in the place to which the engine cooling air produced by the engine cooling fan (4) is blown. Therefore, the cooling air is blown to the common rail (3), and the heat radiation property of the common rail (3) is enhanced, so that a thermal damage of the common rail (3), and a temperature rise of fuel can be suppressed.

(Invention Set Forth in Claim 2)

The invention set forth in Claim 2 achieves the following effects in addition to the effects of the invention set forth in Claim 1.

<Effect> A thermal damage of a fuel supply pump, and a temperature rise of fuel can be suppressed.

As exemplified in FIG. 3 or 10, an upper portion (13) of a fuel supply pump (9) which is upwardly projected from a pump accommodating chamber (8) is placed in the place to which the engine cooling air produced by the engine cooling fan (4) is blown. Therefore, the engine cooling air is blown to the upper portion (13) of the fuel supply pump (9), and the heat radiation property of the fuel supply pump (9) is enhanced, so that a thermal damage of the fuel supply pump (9), and a temperature rise of fuel can be suppressed.

(Invention Set Forth in Claim 3)

The invention set forth in Claim 3 achieves the following effect in addition to the effects of the invention set forth in Claim 2.

<Effect> A power can be taken out from a pump driving chamber.

As exemplified in FIG. 7(A), a power takeoff portion (14) which performs an outputting operation through a pump drive cam shaft (12) is disposed in rear of a pump driving chamber (11). Therefore, a power can be taken out from the pump driving chamber (11) which drives the fuel supply pump (9).

(Invention Set Forth in Claim 4)

The invention set forth in Claim 4 achieves the following effects in addition to the effects of the invention set forth in Claim 2.

<Effect> The accuracy and durability of the fuel supply pump can be enhanced.

As exemplified in FIGS. 7(A) and 7(B), the pump accommodating chamber (8) and the pump driving chamber (11) are separated from each other by a separation wall (15), a pump fitting hole (16) is opened in the separation wall (15), and a tappet guide tube (17) for the fuel supply pump (9) is fitted into the pump fitting hole (16). Therefore, a larger force which, in order to pressure transport high-pressure fuel to the common rail (3), is applied from the pump drive cam shaft (12) to the tappet guide tube (17) through a tappet (18) is received by the separation wall (15), and hence deformation of the tappet guide tube (17) can be suppressed, so that the accuracy and durability of the fuel supply pump (9) can be enhanced.

(Invention Set Forth in Claim 5)

The invention set forth in Claim 5 achieves the following effects in addition to the effects of the invention set forth in Claim 4.

<Effect> Smooth raising and lowering of the tappet can be maintained, and engine oil is suppressed from mixing with fuel.

As exemplified in FIG. 7(A), an air vent hole (19) for raising and lowering of the tappet (18) is disposed in the peripheral wall of the fuel supply pump (9), and, in a portion lower than the air vent hole (19), the tappet guide tube (17) is fitted into the pump fitting hole (16). Therefore, the engine oil which is splashed by the pump drive cam shaft (12) in the pump driving chamber (11) is received by the separation wall (15), and hence hardly enters the air vent hole (19). Consequently, the air vent hole (19) is hardly clogged with the engine oil, and smooth raising and lowering of the tappet (18) are maintained. Furthermore, also mixing of the engine oil into the fuel in the fuel supply pump (9) is suppressed.

(Invention Set Forth in Claim 6)

The invention set forth in Claim 6 achieves the following effect in addition to the effects of the invention set forth in Claim 4.

<Effect> The fuel supply pump can be smoothly installed.

As exemplified in FIG. 7(B), recesses (20), (20) which are recessed in the anteroposterior direction are disposed in front and rear peripheral portions of the pump fitting hole (16), respectively. In the case where the tappet guide tube (17) is fitted into the pump fitting hole (16), even when the fuel supply pump (9) is anteroposteriorly inclined, therefore, the resistance in fitting due to a contact between the tappet guide tube (17) and the front and rear peripheral portions of the pump fitting hole (16) is avoided by the recesses (20), (20), and the fuel supply pump (9) can be smoothly installed.

(Invention Set Forth in Claim 7)

The invention set forth in Claim 7 achieves the following effects in addition to the effects of the invention set forth in Claim 5.

<Effect> The fuel supply pump can be smoothly installed.

As exemplified in FIG. 7(B), recesses (20), (20) which are recessed in the anteroposterior direction are disposed in front and rear peripheral portions of the pump fitting hole (16), respectively. In the case where the tappet guide tube (17) is fitted into the pump fitting hole (16), even when the fuel supply pump (9) is anteroposteriorly inclined, therefore, the resistance in fitting due to a contact between the tappet guide tube (17) and the front and rear peripheral portions of the pump fitting hole (16) is avoided by the recesses (20), (20), and the fuel supply pump (9) can be smoothly installed.

<Effect> The function of suppressing the engine oil from entering the air vent hole is maintained.

As exemplified in FIGS. 7(A) and 7(B), the air vent hole (19) is disposed in the lateral peripheral wall of the fuel supply pump (9) at a position which is deviated from the immediately upper sides of the front and rear recesses (20), (20). Therefore, the engine oil which enters the pump accommodating chamber (8) through the front and rear recesses (20), (20) hardly enters the air vent hole (19) on the lateral side, and the function of suppressing the engine oil from entering the air vent hole (19) is maintained. Therefore, the air vent hole (19) is hardly clogged with the engine oil, and smooth raising and lowering of the tappet (18) are maintained. Furthermore, also mixing of the engine oil into the fuel in the fuel supply pump (9) is suppressed.

(Invention Set Forth in Claim 8)

The invention set forth in Claim 8 achieves the following effect in addition to the effects of the invention set forth in Claim 2.

<Effect> A work of connecting a harness to a plurality of electronic components can be performed in a front portion of the engine.

As exemplified in FIGS. 6 and 7(A), a cam shaft position sensor (25), a pressure regulator valve actuator (28), and a common rail pressure sensor (29) can be consolidated in a front portion of the engine on the side of the common rail (3). A work of connecting a wire harness to the plurality of electronic components (25), (28), (29) can be easily performed in the front portion of the engine.

(Invention Set Forth in Claim 9)

The invention set forth in Claim 9 achieves the following effects in addition to the effects of the invention set forth in Claim 1.

<Effect> A thermal damage of the common rail, and a temperature rise of fuel can be suppressed.

As exemplified in FIGS. 1, 2, 8(A), and 8(B), an engine cooling air guide wall configured by the air intake portion (6) of the intake manifold (2), an EGR valve actuator (32), and an EGR valve case (31) which are arranged in the anteroposterior direction is placed on the outer lateral side of the common rail (3). Therefore, the engine cooling air is suppressed from escaping from the outer lateral side of the common rail (3), and the heat radiation efficiency of the common rail (3) is enhanced, so that a thermal damage of the common rail (3), and a temperature rise of the fuel can be suppressed.

<Effect> The total height of the engine can be suppressed from being increased, and the total length of the engine can be suppressed from being increased.

As exemplified in FIGS. 1 and 2, the EGR valve actuator (32) is forwardly projected from a front portion of the EGR valve case (31). As compared with the case where the EGR valve actuator (32) is upwardly projected from an upper portion of the EGR valve case (31), therefore, the total height of the engine can be suppressed from being increased, and, as compared with the case where the EGR valve actuator (32) is rearwardly projected from a rear portion of the EGR valve case (31), the total length of the engine can be suppressed from being increased.

(Invention Set Forth in Claim 10)

The invention set forth in Claim 10 achieves the following effects in addition to the effects of the invention set forth in Claim 1.

<Effect> The cooling efficiency of the fuel is high.

As exemplified in FIGS. 9 to 11, an engine cooling air guide wall configured by the air intake portion (6) of the intake manifold (2) and an EGR valve actuator (32) which are arranged in the anteroposterior direction is placed on the outer lateral side of the common rail (3). Therefore, the engine cooling air is suppressed from escaping from the outer lateral side of the common rail (3), and the heat radiation efficiency of the common rail (3) is enhanced, so that a thermal damage of the common rail (3), and a temperature rise of the fuel can be suppressed.

<Effect> The total length of the engine can be suppressed from being increased.

As exemplified in FIG. 9, the EGR valve actuator (32) is upwardly projected from the upper portion of the EGR valve case (31). As compared with the case where the EGR valve actuator (32) is rearwardly projected from the rear portion of the EGR valve case (31), therefore, the total length of the engine can be suppressed from being increased.

BRIEF DESCRIPTION OF THE DRAWINGS

FIG. 7(A) is a sectional view taken along line VIIA-VIIA in FIG. 6, and FIG. 7(B) is a sectional view taken along line B-B in FIG. 7(A).

FIG. 8(A) is a perspective view of an intake manifold of the engine of FIG. 1, as viewed right downwardly from the rear side, FIG. 8(B) is a perspective view of the intake manifold, as viewed left downwardly from the rear side, FIG. 8(C) is a vertical sectional view of a check valve, and FIG. 8(D) is a sectional view taken along line D-D in FIG. 8(B).

MODE FOR CARRYING OUT THE INVENTION

FIGS. 1 to 8(D) are views illustrating a vertical straight four-cylinder diesel engine which is a first embodiment of the invention, and FIGS. 9 to 12(B) are views illustrating a vertical straight three-cylinder diesel engine which is a second embodiment of the invention.

The first embodiment will be described.

Figure 3:
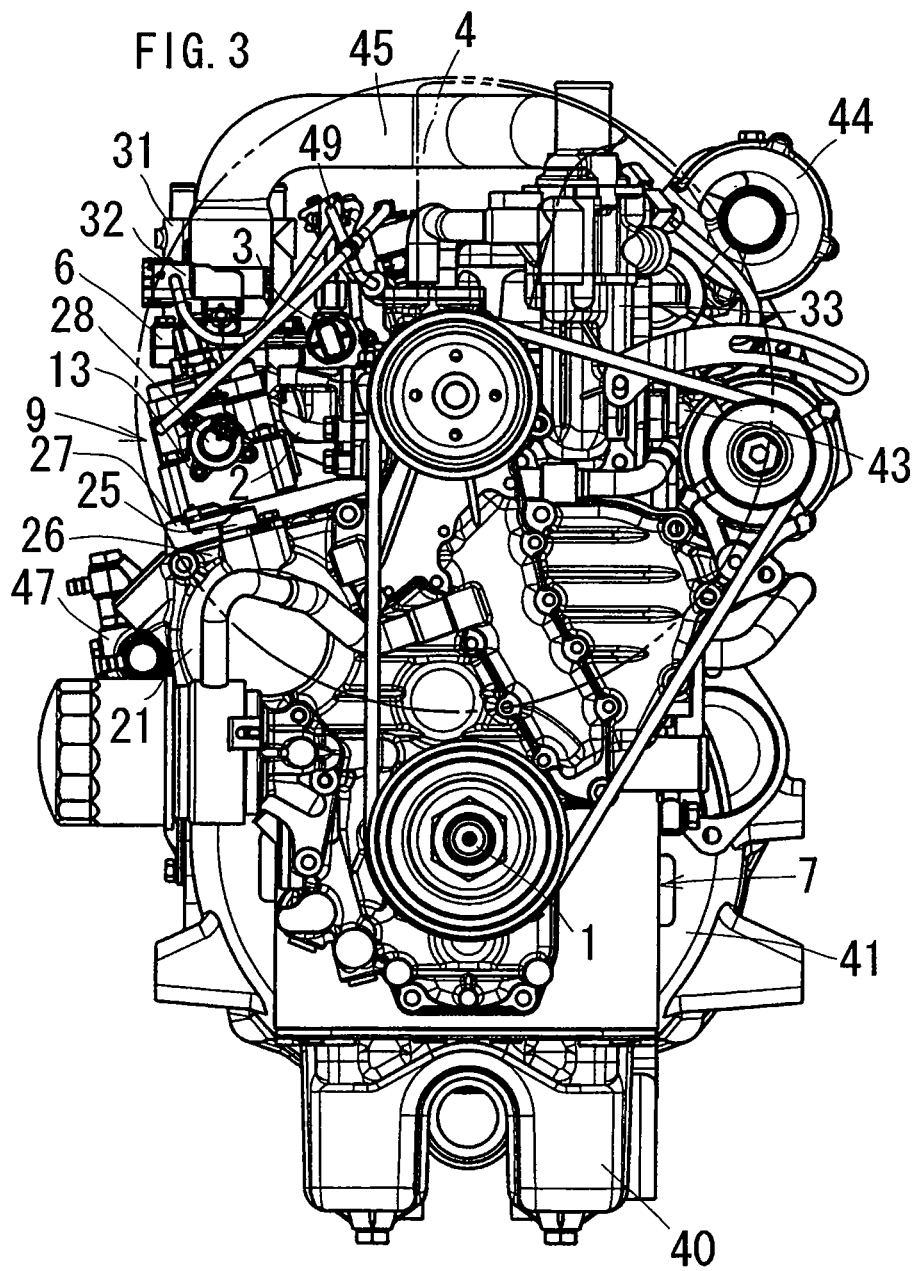
FIG. 3 is a front view of the engine of FIG. 1.
Figure 4:
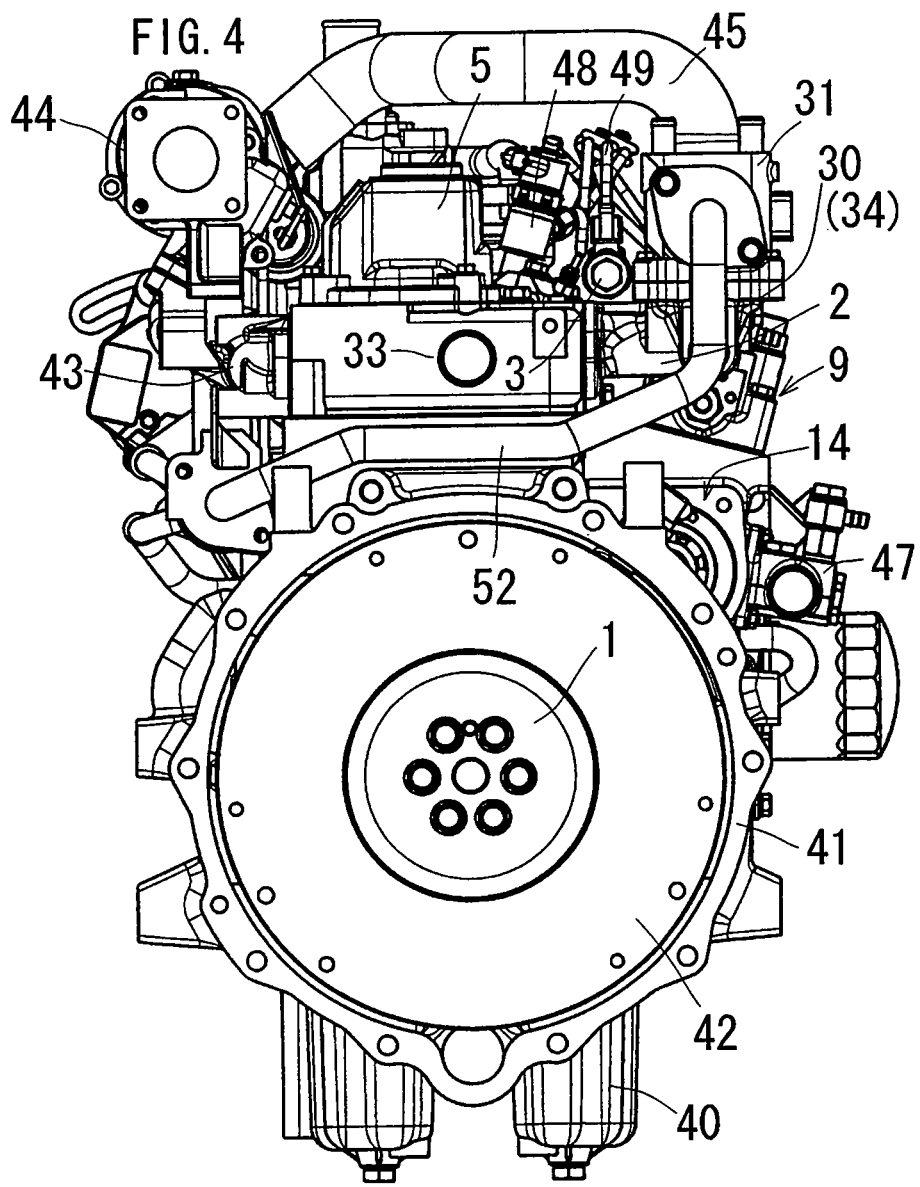
FIG. 4 is a back view of the engine of FIG. 1.
Figure 5:
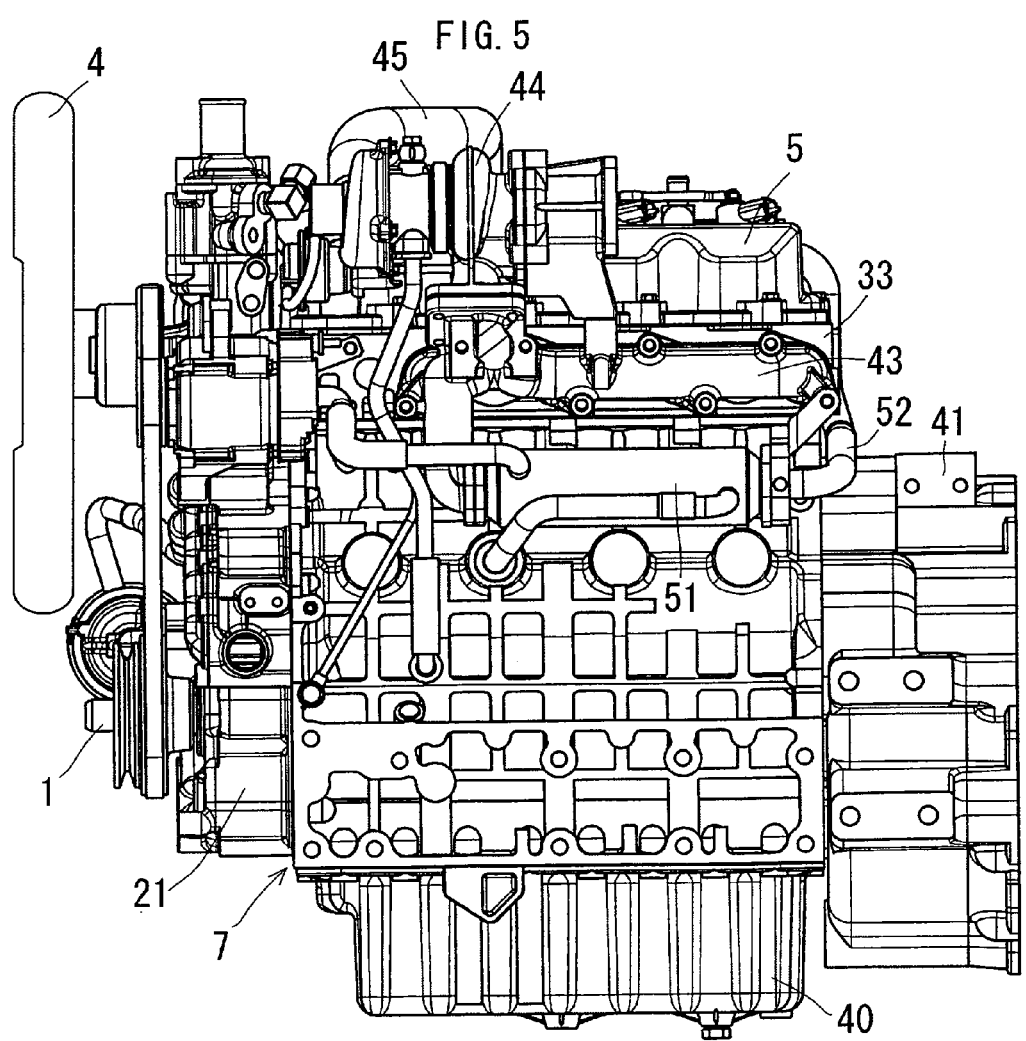
FIG. 5 is a right side view of the engine of FIG. 1.

In the engine, as shown in FIG. 3, a cylinder head (33) is installed to an upper portion of a cylinder block (7), a head cover (5) is installed to an upper portion of the cylinder head (33), an oil pan (40) is installed to a lower portion of the cylinder block (7), and a gear case (21) is installed to a front portion of the cylinder block (7). As shown in FIG. 4, a flywheel housing (41) is installed to a rear portion of the cylinder block (7), and a flywheel (42) installed to a crank shaft (1) is accommodated in the flywheel housing (41).

As shown in FIG. 3, as viewed from the front side of the engine, an intake manifold (2) is installed to the left side of the cylinder head (33), and an exhaust manifold (43) is installed to the right side of the cylinder head (33). A supercharger (44) is attached to an upper portion of the exhaust manifold (43), and supercharging is performed by the supercharger (44) on an air intake portion (6) of the intake manifold (2) through a supercharging pipe (45).

The engine includes a common rail system and an EGR system.

The common rail system is configured in the following manner.

Fuel in a fuel tank (not shown) is supplied to a fuel supply pump (9) through a fuel filter (not shown) and a fuel feed pump (47), and the fuel which is pressurized by the fuel supply pump (9) is supplied to a common rail (3). The fuel which is accumulated in the common rail (3) is injected into a combustion chamber through a fuel injection pipe (49) and a corresponding one of fuel injectors (48) in response to opening of an electromagnetic valve of the fuel injector (48).

The common rail pressure, and the start timing and amount of the fuel injection from the fuel injector (48) are adjusted by the control of an engine ECU (not shown).

The common rail pressure is adjusted by a feedback control in which, while the pressure is detected by a common rail pressure sensor (29), the degree of opening of a pressure regulator valve of the fuel supply pump (9) is adjusted by a pressure regulator valve actuator (28).

The start timing and amount of the fuel injection from the fuel injector (48) are adjusted by adjusting the timing and period of opening of the electromagnetic valve of the fuel injector (48), based on the number of revolutions and load of the engine.

The start timing of opening of the electromagnetic valve of the fuel injector (48) is adjusted on the basis of the crank angle of each combustion cycle of each cylinder which is specified by detection signals of a crank angle sensor (50) and a cam shaft position sensor (25). The crank angle sensor (50) functions also as a sensor for detecting the number of revolutions of the engine. The engine is a four-cycle engine, and hence a pump drive cam shaft (12) makes one rotation during a period when the crank shaft (1) makes two rotations.

The EGR system is configured in the following manner.

As EGR gas, part of the exhaust gas in the exhaust manifold (43) is supplied to the air intake portion (6) of the intake manifold (2) through an EGR cooler (51), an EGR gas relay pipe (52), an EGR valve case (31), an EGR gas introduction case (30), and an EGR gas radiation path (36).

The degree of opening of an EGR valve (38) is adjusted by an EGR valve actuator (32) in accordance with the control of the engine ECU on the basis of the number of revolutions and load of the engine.

The common rail system is improved in the following manner.

Figure 1:
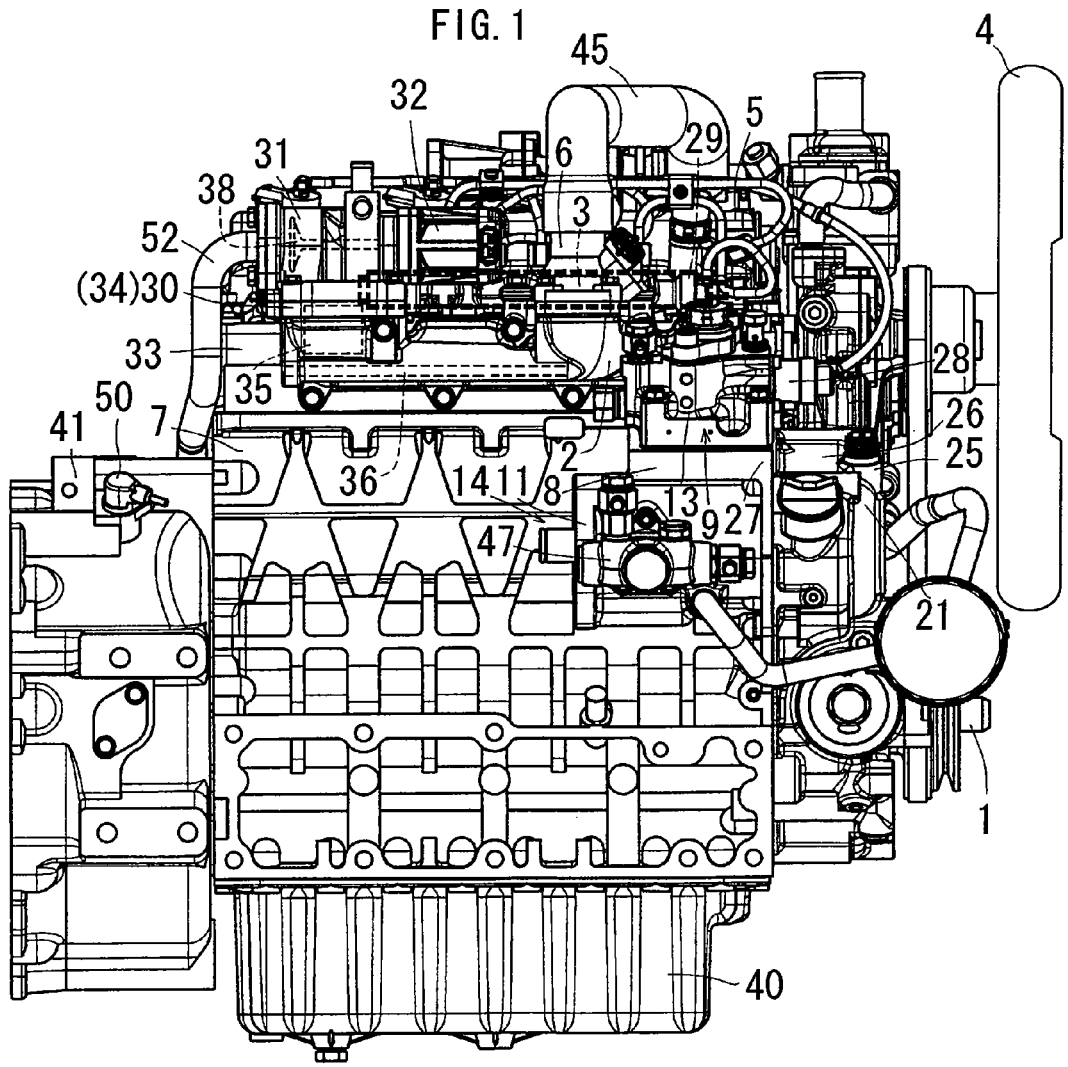
FIG. 1 is a left side view of a vertical straight four-cylinder diesel engine which is a first embodiment of the invention.
Figure 2:
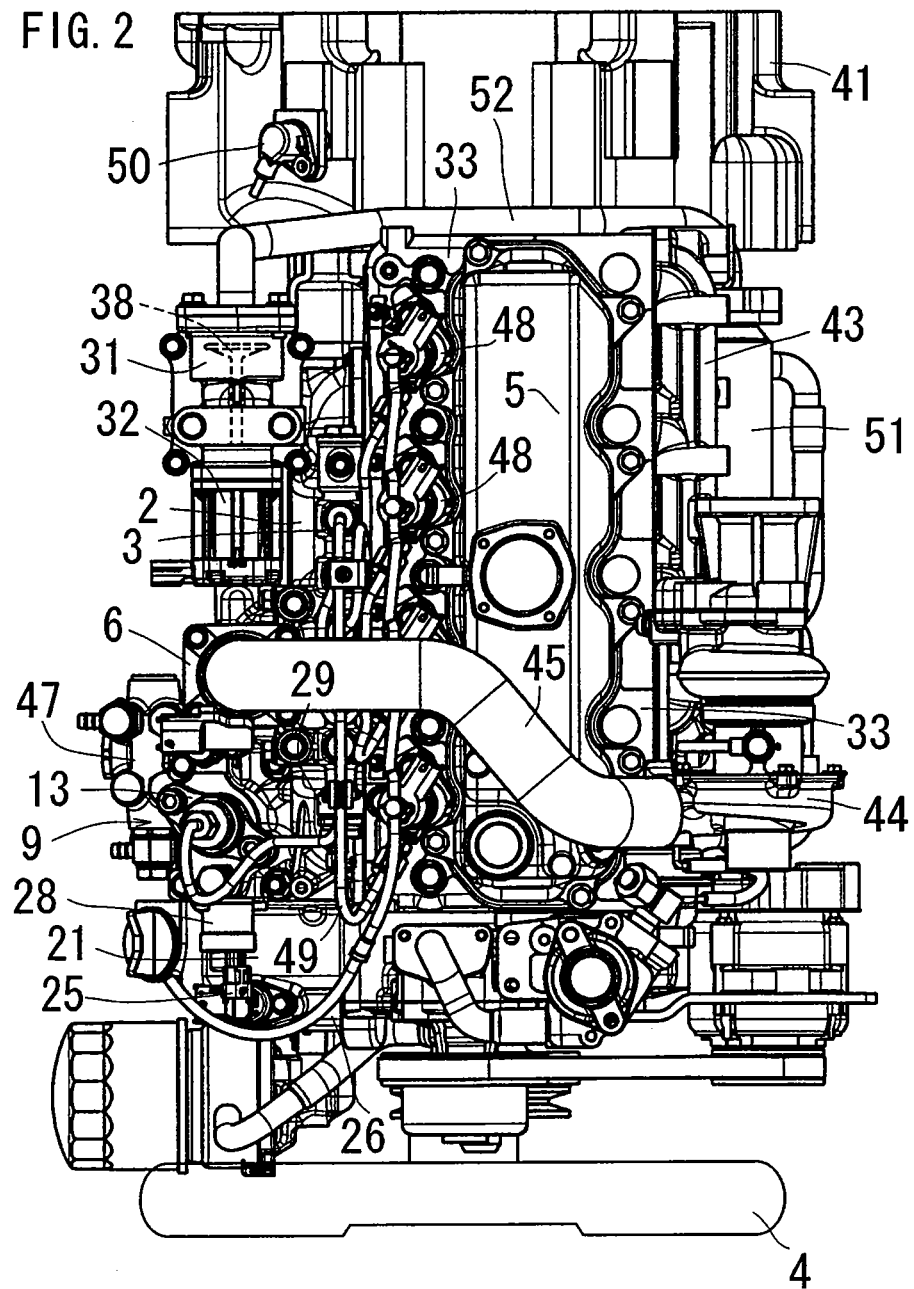
FIG. 2 is a plan view of the engine of FIG. 1.

As shown in FIGS. 1 to 3, while the extension direction of the crank shaft (1) is set to the anteroposterior direction, the common rail (3) which is directed in the anteroposterior direction is placed above the intake manifold (2), and the engine cooling fan (4) is placed in front of the engine.

The width direction of the engine which is perpendicular to the anteroposterior direction is set to the lateral direction, the air intake portion (6) of the intake manifold (2) is placed on the outer lateral side of both lateral sides of the common rail (3), the outer lateral side being opposite to the head cover (5), and the common rail (3) is placed in a place to which engine cooling air produced by the engine cooling fan (4) is blown.

As shown in FIGS. 1 to 3, the common rail (3) is placed immediately above the intake manifold (2), and fixed to the air intake portion (6).

As shown in FIGS. 8(A) and 8(B), the intake manifold (2) has a box-like structure which is elongated in the anteroposterior direction, and which has no branch pipe, and placed along the lateral side wall of the cylinder head (33). In the manifold, the side on the side of the cylinder head (33) is opened, and communicates with intake port inlets (39) of the cylinder head (33).

The fuel injectors (48) are anteroposteriorly arranged along the head cover (5) on the inner lateral one of the both lateral sides of the common rail (3), the inner lateral side being on the side of the head cover (5), and above the cylinder head (33).

Figure 6:
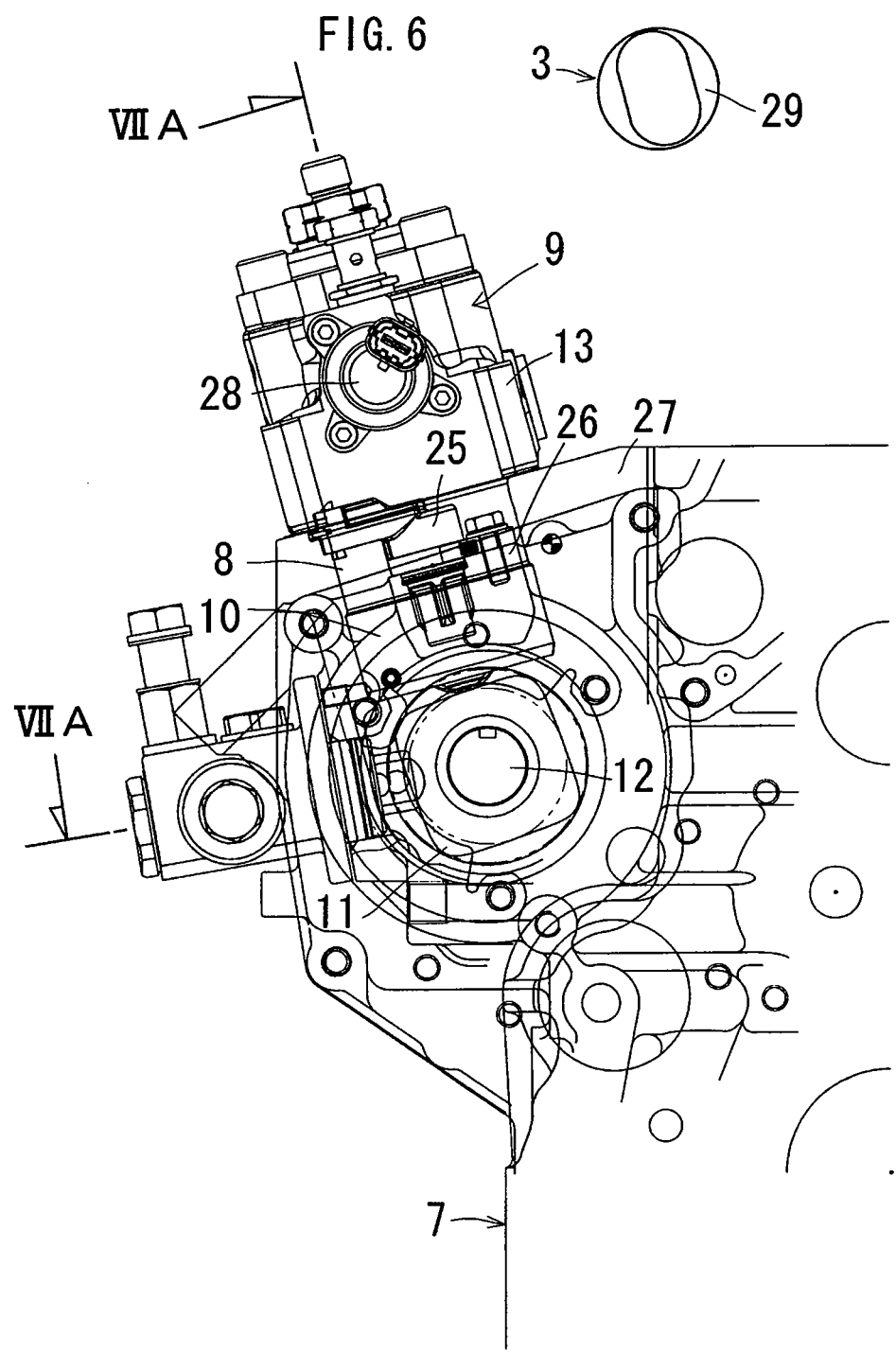
FIG. 6 is a front view of a fuel supply pump of the engine of FIG. 1, and its periphery.
Figures 7A, 7B:
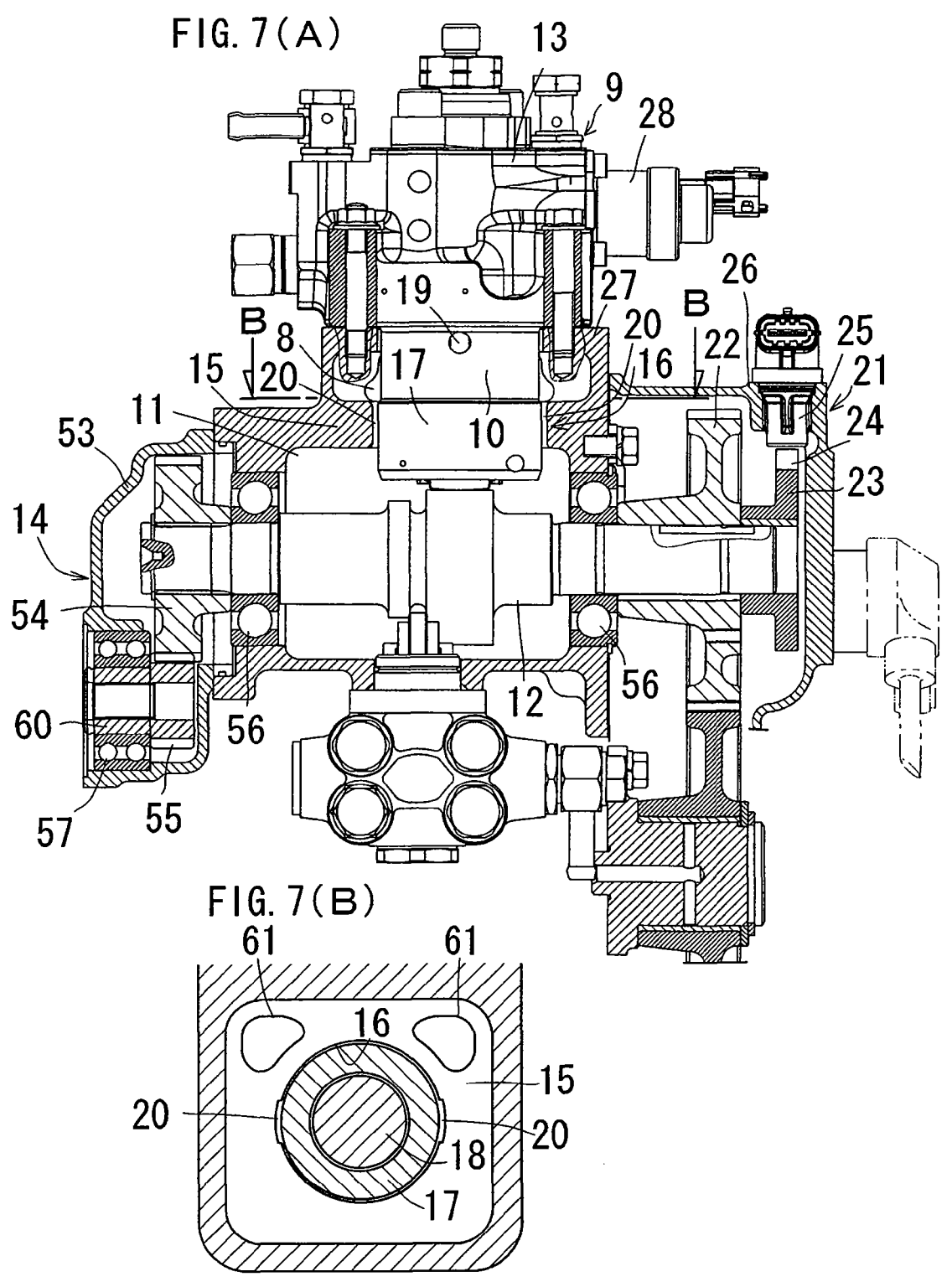
Figure 9:
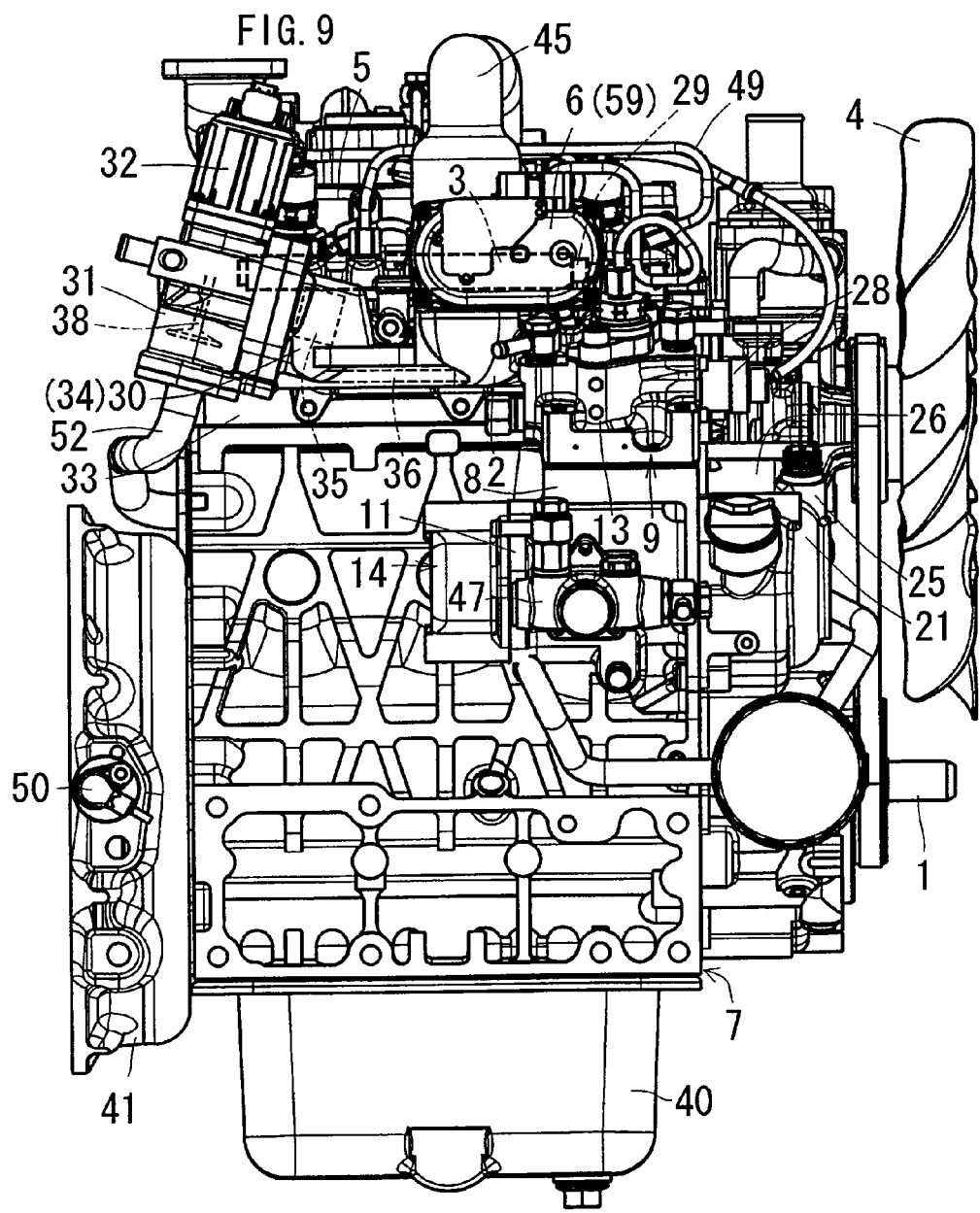
FIG. 9 is a left side view of a vertical straight three-cylinder diesel engine which is a second embodiment of the invention.
Figure 10:
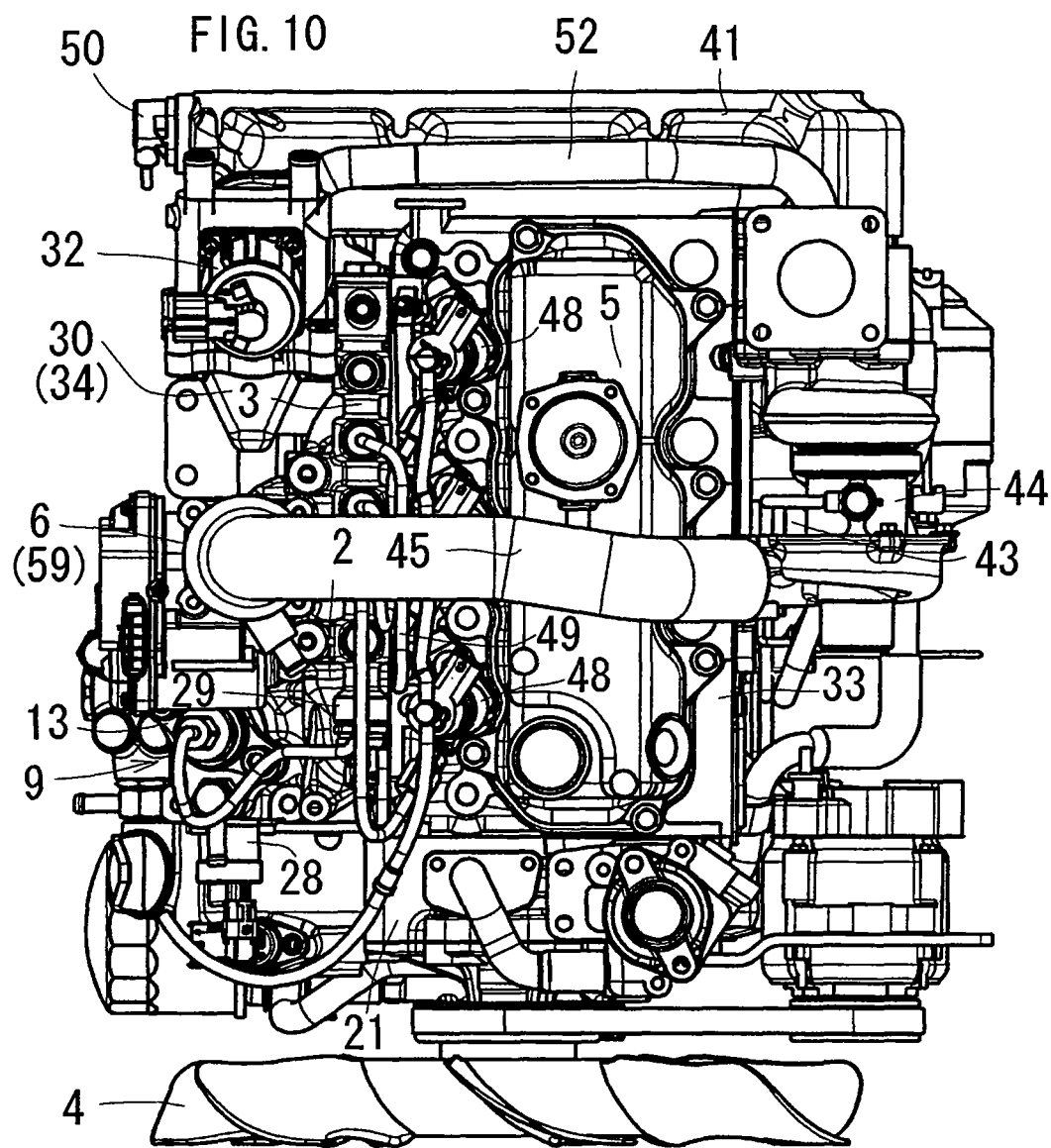
FIG. 10 is a plan view of the engine of FIG. 9.
Figure 11:
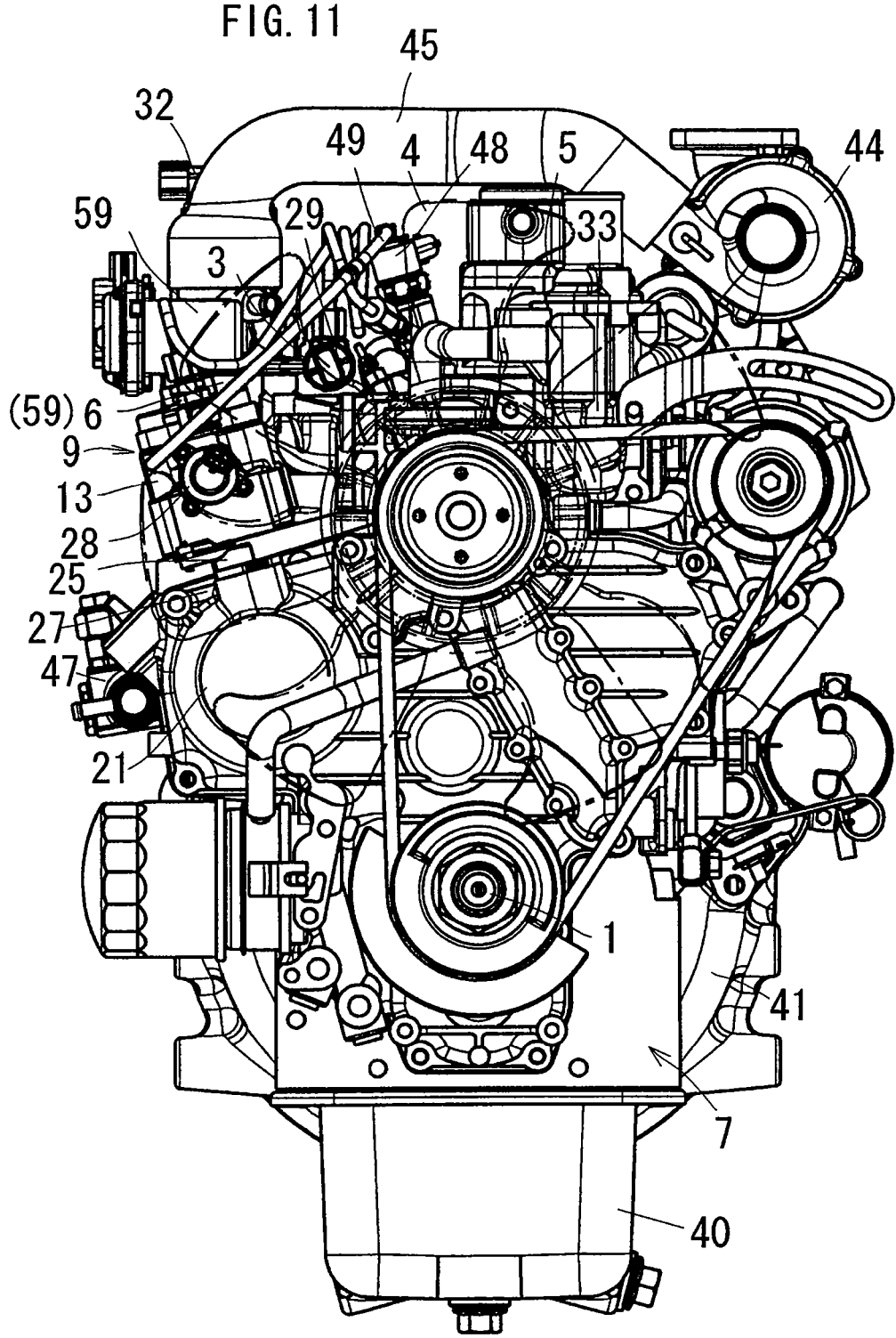
FIG. 11 is a front view of the engine of FIG. 9.
Figure 12A:
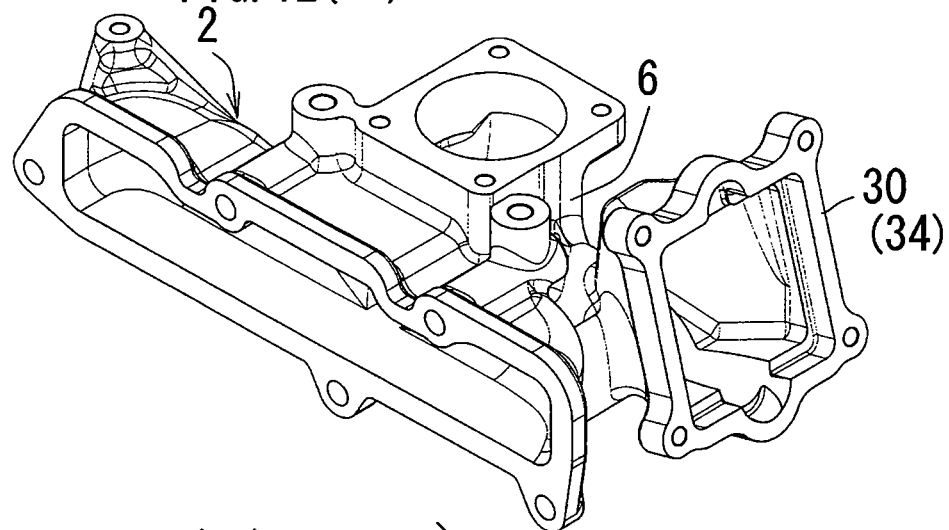
FIG. 12(A) is a perspective view of an intake manifold of the engine of FIG. 9, as viewed right downwardly from the rear side.
Figure 12B:
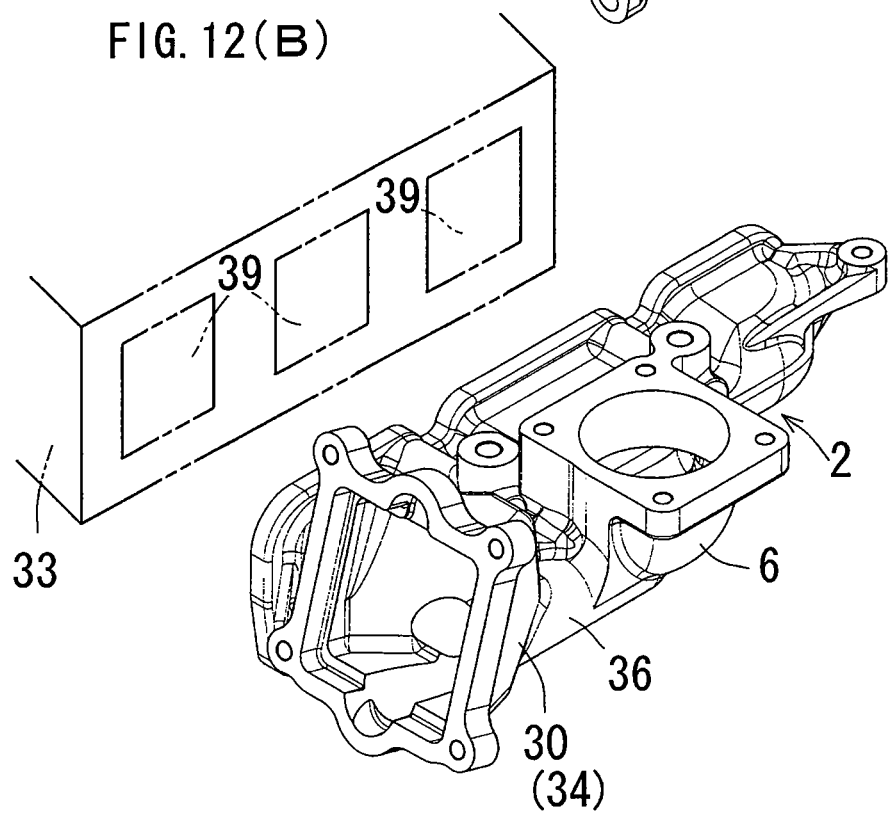
FIG. 12(B) is a perspective view of the intake manifold, as viewed left downwardly from the rear side.

As shown in FIGS. 6 and 7(A), a pump accommodating chamber (8) is formed in a front portion of one of the both lateral sides of the cylinder block (7), the one lateral side being on the side of the common rail (3). A lower portion (10)

of the fuel supply pump (9) which pressure transports the fuel to the common rail (3) is accommodated in the pump accommodating chamber (8). A pump driving chamber (11) is disposed below the pump accommodating chamber (8). The pump drive cam shaft (12) which is directed in the anteroposterior direction is accommodated in the pump driving chamber (11), the fuel supply pump (9) is driven by the pump drive cam shaft (12), and the fuel is pressure transported by the fuel supply pump (9) to the common rail (3).

As shown in FIG. 3, an upper portion (13) of the fuel supply pump (9) which is upwardly projected from the pump accommodating chamber (8) is placed in a place to which engine cooling air produced by the engine cooling fan (4) is blown.

As shown in FIG. 6, the fuel feed pump (47) is projected toward the outer lateral side from the outer lateral side of the pump accommodating chamber (8), and also the fuel feed pump (47) is driven by the pump drive cam shaft (12).

As shown in FIG. 7(A), a power takeoff portion (14) which performs an outputting operation through the pump drive cam shaft (12) is disposed in rear of the pump driving chamber (11).

A power takeoff case (53) is disposed in the power takeoff portion (14). A cam shaft output gear (54) which is attached to the rear end of the pump drive cam shaft (12), an interlocking gear (55) which meshes with the cam shaft output gear (54), and a power takeoff shaft (60) which is rearwardly extended from the interlocking gear (55) are accommodated in the power takeoff case (53). Front and rear portions of the pump drive cam shaft (12) are supported by rolling bearings (56), (56), respectively, and the power takeoff shaft (60) is supported by a rolling bearing (57).

As shown in FIGS. 7(A) and 7(B), the pump accommodating chamber (8) and the pump driving chamber (11) are separated from each other by a separation wall (15), a pump fitting hole (16) is opened in the separation wall (15), and a tappet guide tube (17) for the fuel supply pump (9) is fitted into the pump fitting hole (16).

As shown in FIG. 7(A), an air vent hole (19) for raising and lowering of the tappet (18) is disposed in the peripheral wall of the fuel supply pump (9), and, in a portion lower than the air vent hole (19), the tappet guide tube (17) is fitted into the pump fitting hole (16).

As shown in FIGS. 7(A) and 7(B), recesses (20), (20) which are recessed in the anteroposterior direction are disposed in front and rear peripheral portions of the pump fitting hole (16), respectively. The air vent hole (19) is disposed in the lateral peripheral wall of the fuel supply pump (9) at a position which is deviated from the immediately upper sides of the front and rear recesses (20), (20).

As shown in FIG. 7(B), vertical communicating holes (61) are opened in the separation wall (15) in two of the four corners of the pump accommodating chamber (8), respectively, the two corners being close to the cylinder block (7). The pump accommodating chamber (8) and the pump driving chamber (11) communicate with each other through the vertical communicating holes (61).

The pump driving chamber (11) communicates with the interior of the crank case of the cylinder block (7) through a communicating hole, so that oil mist is supplied from the crank case into the pump driving chamber (11).

As shown in FIGS. 6 and 7(A), the gear case (21) is placed in front of the pump driving chamber (11), a pump drive cam gear (22) and cam shaft rotor (23) which are attached to the pump drive cam shaft (12) are accommodated in the gear case (21), and a cam shaft position sensor (25) which detects a detected portion (24) of the cam shaft rotor (23) is attached to the upper wall (26) of the gear case (21).

The upper wall (27) of the pump accommodating chamber (8) is placed in rear of the upper wall (26) of the gear case (21), the pressure regulator valve actuator (28) is placed in front of the upper portion (13) of the fuel supply pump (9) which is upwardly projected from the upper wall (27) of the pump accommodating chamber (8), and the common rail pressure sensor (29) is placed in the front end of the common rail (3).

As shown in FIGS. 1 and 2, the EGR gas introduction case (30) is disposed on the outer lateral side of the both lateral sides of the intake manifold (2), the outer lateral side being opposite to the cylinder head (33), along a rear portion of the outer lateral side wall of the intake manifold (2), the EGR valve case (31) is attached to an upper portion of the EGR gas introduction case (30), the EGR valve actuator (32) is forwardly projected from a front portion of the EGR valve case (31), and an engine cooling air guide wall configured by the air intake portion (6) of the intake manifold (2), the EGR valve actuator (32), and the EGR valve case (31) which are arranged in the anteroposterior direction is placed on the outer lateral side of the common rail (3).

The EGR system is improved in the following manner.

As shown in FIG. 1, the EGR valve case (31) and a check valve case (34) are placed in a middle of an EGR path, and a reverse flow from the intake side is blocked by a check valve (35) accommodated in the check valve case (34). The check valve case (34) is the above-described EGR gas introduction case (30). As shown in FIG. 8(C), the check valve (35) is a reed valve which is attached to a wedge-shaped valve holder (58).

As shown in FIG. 8(D), the check valve case (34) and a rear portion of the intake manifold (2) communicate with each other through an EGR gas shunt path (37).

Even in the case where the air intake portion (6) of the intake manifold (2) is separated from the intake port inlet (39) of the rear cylinder, therefore, the EGR gas flows into the vicinity of the intake port inlet (39) of the rear cylinder through the EGR gas shunt path (37). Consequently, the EGR gas can be uniformly distributed to the cylinders, so that combustions in the cylinders can be uniformalized and the engine output can be enhanced.

The second embodiment shown in FIGS. 9 to 12(B) is different from the first embodiment in the following points.

The engine of the second embodiment is a vertical straight three-cylinder diesel engine.

The EGR valve case (31) is attached to a rear portion of the EGR gas introduction case (30), i.e., the check valve case (34), the EGR valve actuator (32) is upwardly projected from an upper portion of the EGR valve case (31), and an engine cooling air guide wall configured by the air intake portion (6) of the intake manifold (2) and the EGR valve actuator (32) which are arranged in the anteroposterior direction is placed on the outer lateral side of the common rail (3).

An EGR gas shunt path is not disposed between the EGR gas introduction case (30), i.e., the check valve case (34), and the intake manifold (2).

The air intake portion (6) of the intake manifold (2) includes a throttle body (59) which accommodates an intake throttle valve.

The other configuration is identical with that of the first embodiment, and, in FIGS. 9 to 12(B), the components which are identical with those of the first embodiment are denoted by the same reference numerals.

DESCRIPTION OF REFERENCE NUMERALS (1) crank shaft
(2) intake manifold (3) common rail
(4) engine cooling fan
(5) head cover
(6) air intake portion
(7) cylinder block
(8) pump accommodating chamber
(9) fuel supply pump
(10) lower portion of fuel supply pump
(11) pump driving chamber
(12) pump drive cam shaft
(13) upper portion of fuel supply pump
(14) power takeoff portion
(15) separation wall
(16) pump fitting hole
(17) tappet guide tube
(18) tappet
(19) air vent hole
(20) recess
(21) gear case
(22) pump drive cam gear
(23) cam shaft rotor
(24) detected portion
(25) cam shaft position sensor
(26) upper wall of gear case
(27) upper wall of pump accommodating chamber
(28) pressure regulator valve actuator
(29) common rail pressure sensor
(30) EGR gas introduction case
(31) EGR valve case
(32) EGR valve actuator
(33) cylinder head

What is claimed is:

1. A multi-cylinder diesel engine in which, while an extension direction of a crank shaft (1) is set to an anteroposterior direction,
a common rail (3) which is directed in the anteroposterior direction is placed above an intake manifold (2), and an engine cooling fan (4) is placed in front of said engine, wherein
a width direction of said engine which is perpendicular to the anteroposterior direction is set to a lateral direction, an air intake portion (6) of said intake manifold (2) is placed on an outer lateral side of both lateral sides of said common rail (3), the outer lateral side being opposite to a head cover (5), and said common rail (3) is placed in a place to which engine cooling air produced by said engine cooling fan (4) is blown.

2. A multi-cylinder diesel engine according to claim 1, wherein
a pump accommodating chamber (8) is formed in a front portion of one of both lateral sides of a cylinder block (7), the one lateral side being on a side of said common rail (3), a lower portion (10) of a fuel supply pump (9) which pressure transports fuel to said common rail (3) is accommodated in said pump accommodating chamber (8), a pump driving chamber (11) is disposed below said pump accommodating chamber (8), a pump drive cam shaft (12) which is directed in the anteroposterior direction is accommodated in said pump driving chamber (11), said fuel supply pump (9) is driven by the pump drive cam shaft (12), the fuel is pressure transported by said fuel supply pump (9) to said common rail (3), and
an upper portion (13) of said fuel supply pump (9) which is upwardly projected from said pump accommodating chamber (8) is placed in a place to which engine cooling air produced by said engine cooling fan (4) is blown.

3. A multi-cylinder diesel engine according to claim 2, wherein
a power takeoff portion (14) which performs an outputting operation through said pump drive cam shaft (12) is disposed in rear of said pump driving chamber (11).

4. A multi-cylinder diesel engine according to claim 2, wherein
said pump accommodating chamber (8) and said pump driving chamber (11) are separated from each other by a separation wall (15), a pump fitting hole (16) is opened in said separation wall (15), and a tappet guide tube (17) for said fuel supply pump (9) is fitted into said pump fitting hole (16).

5. A multi-cylinder diesel engine according to claim 4, wherein
an air vent hole (19) for raising and lowering of a tappet (18) is disposed in a peripheral wall of said fuel supply pump (9), and, in a portion lower than said air vent hole (19), said tappet guide tube (17) is fitted into said pump fitting hole (16).

6. A multi-cylinder diesel engine according to claim 4, wherein
recesses (20), (20) which are recessed in the anteroposterior direction are disposed in front and rear peripheral portions of said pump fitting hole (16), respectively.

7. A multi-cylinder diesel engine according to claim 5, wherein
recesses (20), (20) which are recessed in the anteroposterior direction are disposed in front and rear peripheral portions of said pump fitting hole (16), respectively, and
the air vent hole (19) is disposed in a lateral peripheral wall of said fuel supply pump (9) at a position which is deviated from immediately upper sides of said front and rear recesses (20), (20).

8. A multi-cylinder diesel engine according to claim 2, wherein
a gear case (21) is placed in front of said pump driving chamber (11), a pump drive cam gear (22) and cam shaft rotor (23) which are attached to said pump drive cam shaft (12) are accommodated in said gear case (21), a cam shaft position sensor (25) which detects a detected portion (24) of said cam shaft rotor (23) is attached to an upper wall (26) of said gear case (21), an upper wall (27) of said pump accommodating chamber (8) is placed in rear of said upper wall (26) of said gear case (21), a pressure regulator valve actuator (28) is placed in front of said upper portion (13) of said fuel supply pump (9) which is upwardly projected from said upper wall (27) of said pump accommodating chamber (8), and
a common rail pressure sensor (29) is placed in a front end of said common rail (3).

9. A multi-cylinder diesel engine according to claim 1, wherein
an EGR gas introduction case (30) is disposed on an outer lateral side of both lateral sides of said intake manifold (2), the outer lateral side being opposite to said cylinder head (33), along a rear portion of said outer lateral side wall of said intake manifold (2),
an EGR valve case (31) is attached to an upper portion of said EGR gas introduction case (30), an EGR valve actuator (32) is forwardly projected from a front portion of said EGR valve case (31), and
an engine cooling air guide wall configured by said air intake portion (6) of said intake manifold (2), said EGR valve actuator (32), and said EGR valve case (31) which are arranged in the anteroposterior direction is placed on the outer lateral side of said common rail (3).

10. A multi-cylinder diesel engine according to claim 1, wherein
- an EGR gas introduction case (30) is disposed on an outer lateral side of both lateral sides of said intake manifold (2), the outer lateral side being opposite to said cylinder head (33), along a rear portion of said outer lateral side wall of said intake manifold (2),
- an EGR valve case (31) is attached to a rear portion of said EGR gas introduction case (30), an EGR valve actuator (32) is upwardly projected from an upper portion of said EGR valve case (31), and
- an engine cooling air guide wall configured by said air intake portion (6) of said intake manifold (2) and said EGR valve actuator (32) which are arranged in the anteroposterior direction is placed on the outer lateral side of said common rail (3).

* * * * *